United States Patent
Bayrle et al.

(10) Patent No.: US 6,803,978 B2
(45) Date of Patent: Oct. 12, 2004

(54) LCD-DISPLAY PANEL HAVING PLURALITY OF DISPLAY MODULES WITH PLURALITY OF PIXELS

(75) Inventors: Reiner Bayrle, Langenau (DE); Otto Bader, Warthausen (DE); Thomas Bitter, Bad Ditzenbach (DE)

(73) Assignee: Gesellschaft fur moderne formationssysteme mbH (DE)

( * ) Notice: Subject to any disclaimer, the term of this patent is extended or adjusted under 35 U.S.C. 154(b) by 219 days.

(21) Appl. No.: 10/071,109

(22) Filed: Feb. 8, 2002

(65) Prior Publication Data

US 2002/0118320 A1 Aug. 29, 2002

(30) Foreign Application Priority Data

Feb. 21, 2001 (DE) .......................... 101 08 411

(51) Int. Cl.[7] ....................... G02F 1/133; G02F 1/1335; G02F 1/1347; G02F 1/1345
(52) U.S. Cl. ................ 349/73; 349/62; 349/74; 349/149
(58) Field of Search ................ 349/61, 62, 70, 349/73, 74, 149; 362/31

(56) References Cited

U.S. PATENT DOCUMENTS

| | | |
|---|---|---|
| 4,138,620 A | 2/1979 | Dickson |
| 4,824,215 A | 4/1989 | Joseph et al. |
| 4,832,457 A | 5/1989 | Saitoh et al. |
| 5,164,853 A * | 11/1992 | Shimazaki .................... 349/73 |
| 5,673,091 A | 9/1997 | Boisdron et al. |
| 5,838,405 A * | 11/1998 | Izumi et al. ................... 349/73 |
| 6,285,343 B1 * | 9/2001 | Brody ........................ 345/1.1 |

FOREIGN PATENT DOCUMENTS

| | | |
|---|---|---|
| DE | 4209072 A1 | 9/1993 |
| DE | 29607786 U1 | 10/1996 |
| DE | OS10023378.3 | 10/2001 |
| FR | 2713812 A1 | 6/1995 |
| JP | 61118789 | 6/1986 |
| JP | 07020443 | 1/1995 |

OTHER PUBLICATIONS

U.S. patent application Publication 2002/0026734, equivalent for DE–OS 100 23 378.3 A1.
Japanese Patent Abstract, Application No. 10112580, Application Date Apr. 25, 1998, Publication No. 11073127 A, Publication Date Mar. 16, 1999.
English–Language Abstract for JP 07128671 from the European Patent Office.

* cited by examiner

Primary Examiner—Tarifur R. Chowdhury
(74) Attorney, Agent, or Firm—Dority & Manning, P.A.

(57) ABSTRACT

A liquid crystal display (LCD) panel having LCD-modules with a plurality of picture element (pixels), a control circuit, and a backlight apparatus, the control circuit in communication with the pixels, the backlight apparatus configured to backlight the control circuit, the LCD panel comprising: a first edge zone and a second edge zone defined on at least a first and a second LCD-module, the control circuit disposed about the first edge zone, the first edge zone of the first LCD-module interposed between the backlight apparatus and the second edge zone of the second LCD-module, the first edge zone of the first LCD-module spaced apart from the second edge zone of the second LCD-module at a distance configured to accommodate a light device for shadow reduction.

28 Claims, 6 Drawing Sheets

LCD-DISPLAY PANEL HAVING PLURALITY OF DISPLAY MODULES WITH PLURALITY OF PIXELS

FIELD OF THE INVENTION

The invention concerns an LCD-display panel.

BACKGROUND OF THE INVENTION

LCD displays, in recent times, are being installed not only for small surfaced displays for use in PCs, measurement instruments and the like, but are being found in large panel displays such as are found in public transit services, in airports and in similar applications. In these cases, large surface LCD-display panels are made out of a multiplicity of LCD-modules set side by side and above one another. The single LCD-display module possess in each case, a plurality of single, controllable pixel elements. In order to be able to control these pixel elements, control circuits are assigned to each LCD-module. Such circuits are normally installed in the edge areas of the LCD-display module. LCD-display panels of this type have been disclosed by DE 296 07 786 U1. The individual LCD-display modules have been made known by DE 42 09 072 A1. However, if the display modules disclosed by DE 42 09 072 A1 are placed next to and above one another, then dark, inactive stripes appear in which no display is possible. In the case of the LCD-display panel of DE 296 07 786 U1 technology, the individual LCD-modules, however, were placed within a framework so that a cross-hatched pattern was formed. However, again, in the lines of the cross-hatching, no display could be made. Rather, what was optically created was an impression of a multiplicity of single displays located side by side and above and below one another.

BRIEF SUMMARY OF THE INVENTION

Using as a starting point, the LCD-display panel disclosed by DE 296 07 786 U1, the present invention provides a composite LCD-display panel from a plurality of individual LCD-displays placed side by side and top and bottom from each other in which, between the individual LCD-display modules, nearly no passive surfaces remain.

Because of the fact that contiguous LCD-modules in the edge zones in which the control circuits are placed overlap in the manner of shingles, the control circuits can be covered over so that no passive surfaces continue to exist in the display surface. However, the control circuits cause dark shadows where the edge zones overlap. In order to prevent these dark shadows in the overlap zone, the two neighboring LCD-display modules in the overlap zone are not placed in immediate contact with one another, but exhibit a slight intervening distance therebetween and a backlight apparatus is utilized. Specifically, in the interstitial space so made, a light deflecting element, or an illuminating element, is placed. The light deflecting element, or the illuminating element, compensates for the shadowing of the backlight caused by the control circuits. In this way, in an observation of the LCD-display panel, no dark zones appear in the overlap areas. Thus, the backlight apparatus diverts ambient light through the LCD-display panel in accordance with this aspect of the invention.

In accord with an embodiment of the invention, any of the following can be installed as illuminating elements: micro-LEDs, organic LEDs, light emitting polymers (LEPs), or cold cathode fluorescent light emitters. The intensity of this illumination element is controlled such that the shadowing of the actual backlight is compensated for. Thus, upon observing the display, the overlap zone is not visible.

In accord with another embodiment, light can be deflected in the form of films with a microstructure such as via Fresnel lenses or micro prisms, or films with hologram structure can be employed. By such films, incident light falling in the lateral area of the overlap zone is redirected or re-radiated forward. Therefore, the second edge zone of the involved LCD-display module is lighted from the rear.

In accord with a further embodiment of the invention, the control circuits are placed in the first edge zone on a transparent carrying material. In this arrangement, the shadowing of the backlight apparatus by opaque elements, such as the control circuits, is reduced in the over-lapping area. In a similar advantageous aspect, the control circuits are embedded or encapsulated in a transparent matrix.

In another advantageous embodiment of the invention, the polarization filters employed in the LCD-display modules are not installed—as was the previous practice—up to the first edge zone. Rather, the polarization filters extend themselves principally over the active display surface; i.e., over the pixel elements of the respective LCD-display modules. Again, this measure reduces the darker areas and at least a portion of the backlight can diffuse through the conventionally used glass carrier in the polarization filter-free surfaces.

In a further advantageous embodiment of the invention, the individual LCD-display modules are tilted or inclined in relation to the general display surface. In this manner, the offset, which otherwise would be in evidence over the greater area because of the shingled arrangement, is compensated for.

In accord with yet another advantageous embodiment of the invention, square or quadrilateral shaped LCD-display modules are employed. In this aspect, the first and the second edge zones are designed to lie opposite one another. On the two other edge zones of the square or rectangle in which no control circuit is to be found, the LCD-display modules can be placed directly against one another by a joint such that a nearly contiguous transition contact is provided. This arrangement is to be found in the alignment described in DE-OS 100 23 378.3. To this stated DE-OS 100 23 378.3 is incorporated by reference.

As to further advantageous embodiments of the invention, the connection lines to the control circuits and to the illuminating element in the overlap areas are in the form of transparent, ribbon conductors. Accordingly, the shadowing of the backlight is diminished.

BRIEF DESCRIPTION OF THE DRAWINGS

Further details, features, and advantages of the invention are provided by the following detailed description with the aid of the drawing in which:

FIG. 6 is a detailed presentation of the overlap zone between two LCD-display modules with a light diverter in between.

The following detailed description uses numerical and letter designations to refer to features in the drawings. Like or similar designations in the drawings and description have been used to refer to like or similar parts of the invention.

DETAILED DESCRIPTION OF THE DRAWINGS

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 1:
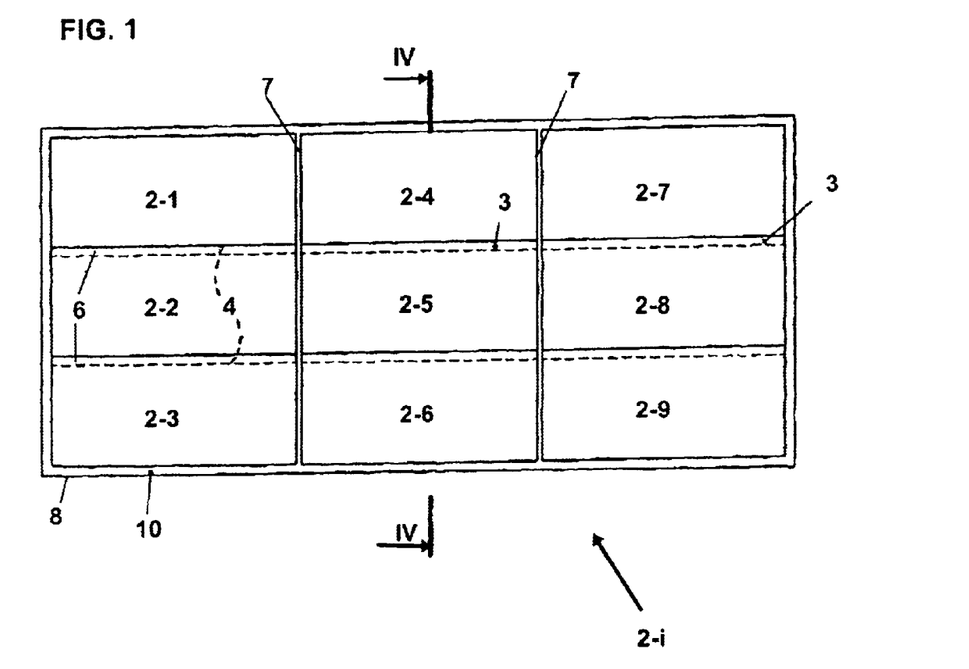
FIG. 1 is a top view of an embodiment of the invention.

FIG. 1 shows a top view of an embodiment of the invention in the case of an LCD-display panel 2-i. In accord with this aspect, a total of nine LCD-display modules 2-1 to 2-9 are combined. In this embodiment three LCD-display modules are placed respectively in three contiguous vertical rows. In each row, respectively, two of the vertically disposed LCD-display modules overlap, forming at each juncture an overlap zone 3. The side by side LCD-display modules, e.g., 2-1 and 2-4, have a joint 7 between them.

Each rectangular shaped LCD-display module 2 possesses a first and a second edge zone, designated respectively 4 and 6, which lie at opposite sides of the rectangular shape. Stated otherwise, in the relative orientation of the embodiment in FIG. 1, the first edge zone 4 is found below while the opposite side, i.e., the second edge zone 6, is located above. More specifically, first edge zone 4 of the first LCD-display module 2-1 is covered over by the second edge zone 6 of the second LCD-display module 2-2, so that the first edge zone 4 of the first LCD-display module 2-1 and the second edge zone 6 of the second LCD-display module 2-2 form in common an overlay zone 3. In the same manner, the first edge zone 4 of the second LCD-display module 2-2 is likewise covered over by the second edge zone 6 of the third LCD-display module 2-3. The first edge zone 4 of the third LCD-display module 2-3 is covered by a frame 8. The frame 8 peripherally encloses the entire display panel with all nine LCD-display modules 2. The placement of the LCD-display module 2-1 to 2-3 repeals itself for the LCD-display modules 2-4 to 2-6 and likewise, 2-7 to 2-9. The holding together of the vertically and horizontally neighboring LCD-display modules is furnished by a transparent, applied matrix, not described in further detail, which is provided in the area of the joints 7 of the adjacently situated LCD-display modules 2.

Figure 2:
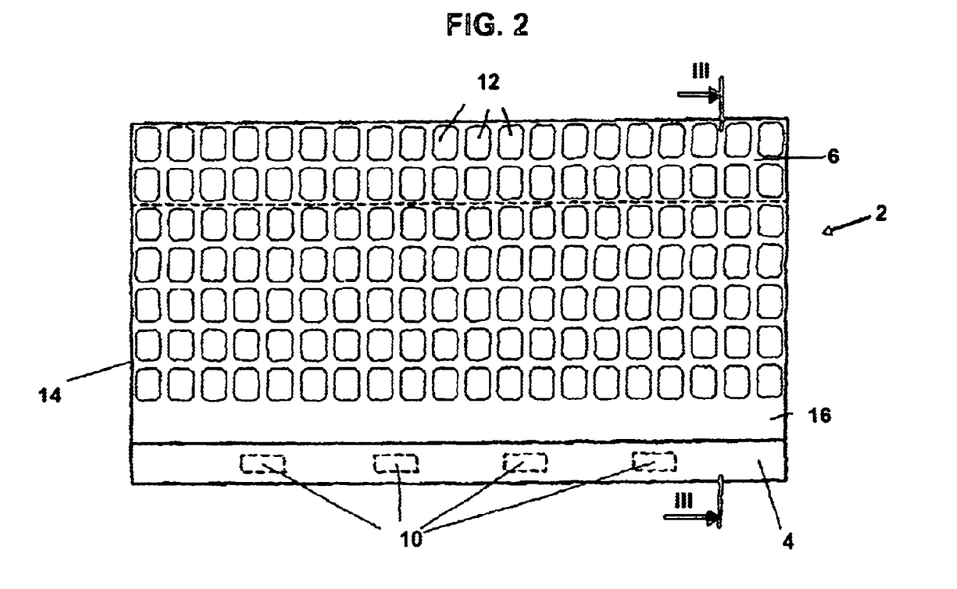
FIG. 2 is a top view on an individual LCD-display module.
Figure 3:
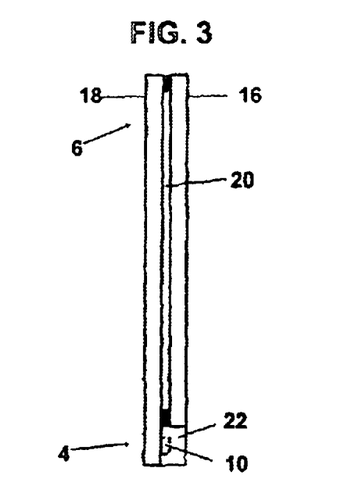
FIG. 3 is a cross-sectional view along the line III—III of FIG. 2.

FIG. 2 depicts an individual LCD-display module 2 in plan view and FIG. 3 presents a section along the line III—III in FIG. 2. The first edge zone 4 is placed below and the second edge zone 6 is placed above. On the first edge zone 4 a plurality of control circuits 10 is arranged, which by a multiplicity of connecting lines (not shown) are connected with a corresponding multiplicity of pixel elements 12. The pixel elements first extend themselves in the form of a set of columns and rows over the same surface of the LCD-display module 2 with the exception of the first edge zone 4. On the lateral edges 14, LCD-display modules 2, lying next to one another, are placed against a jointing, so that a horizontal, unbroken display surface is formed.

FIG. 3 shows that the LCD-display module 2 includes a transparent, first carrier plate 16 and a transparent, second carrier plate 18 between which a liquid crystal 20 is encapsulated. In this arrangement, the second carrier plate 18 is somewhat larger and hence extends beyond the first carrier plate 16 into the first edge zone 4. In the first edge zone 4 are located the control circuits 10 and are embedded in a transparent matrix 22.

Figure 4:
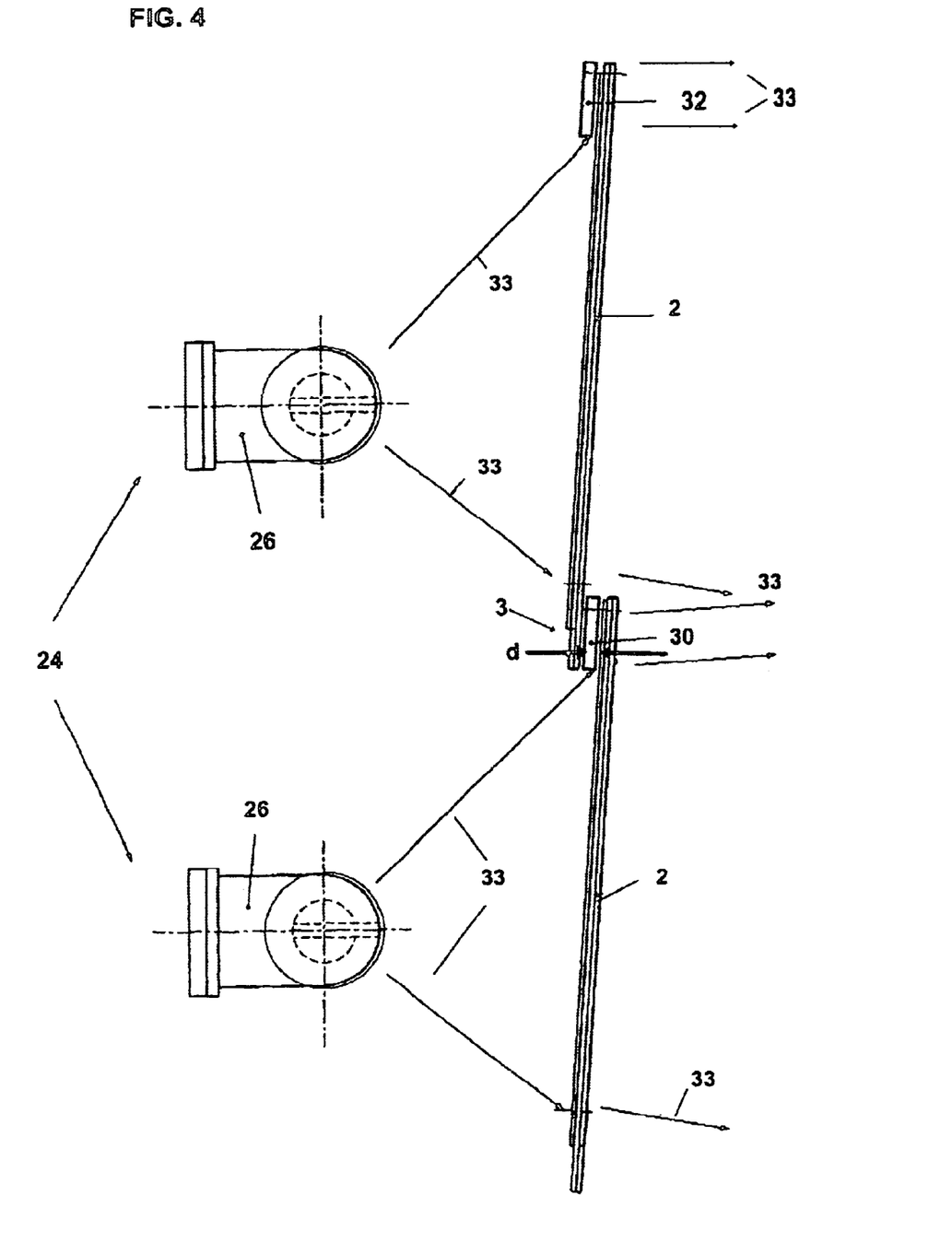
FIG. 4 is a partial view along the line IV—IV of FIG. 1.

As may be seen in FIG. 4, behind the LCD-display modules 2, a backlight apparatus 24 is installed, which comprises a plurality of illumination elements 26. In this arrangement, for each LCD-display module 2, one illuminating element 26 is assigned. Those LCD-display modules 2 which overlap are separated from one another in the overlap zone 3 by a distance d. In the interstitial space caused by the overlap, an overlap light element 30, or a passive light deflection element 32, is placed. By the overlap light element 30 or by the light deflection element 32, the shadowing produced by the backlight 24 being blocked by the opaque control circuit 10 in the first edge zone 4 of the LCD-display modules 2 is compensated for. The reference number 33 denotes beams of light, which, originating in the backlight apparatus 24, come from behind and penetrate the individual LCD-display modules 2.

Figure 5:
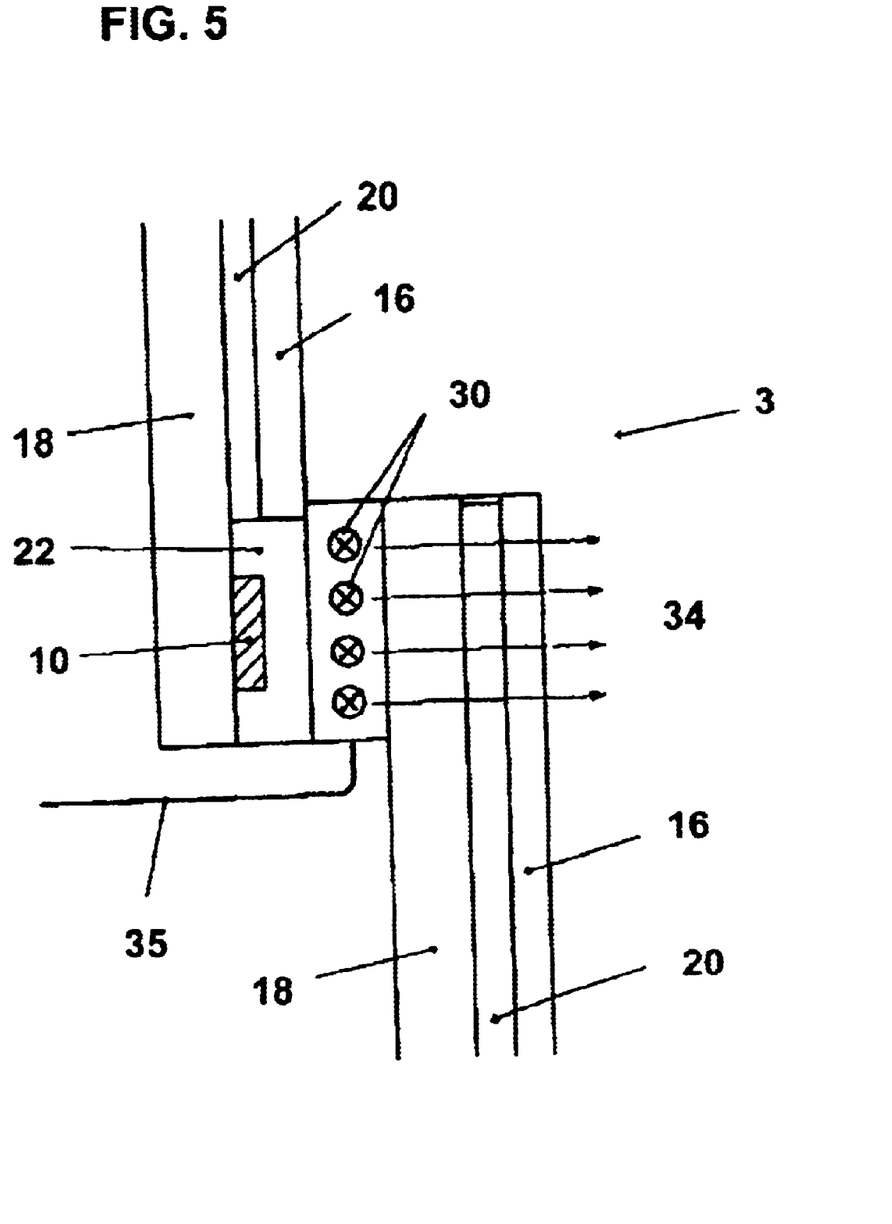
FIG. 5 is a detail view of the overlap zone between two LCD-display modules with an overlap illuminating element therebetween.
Figure 6:
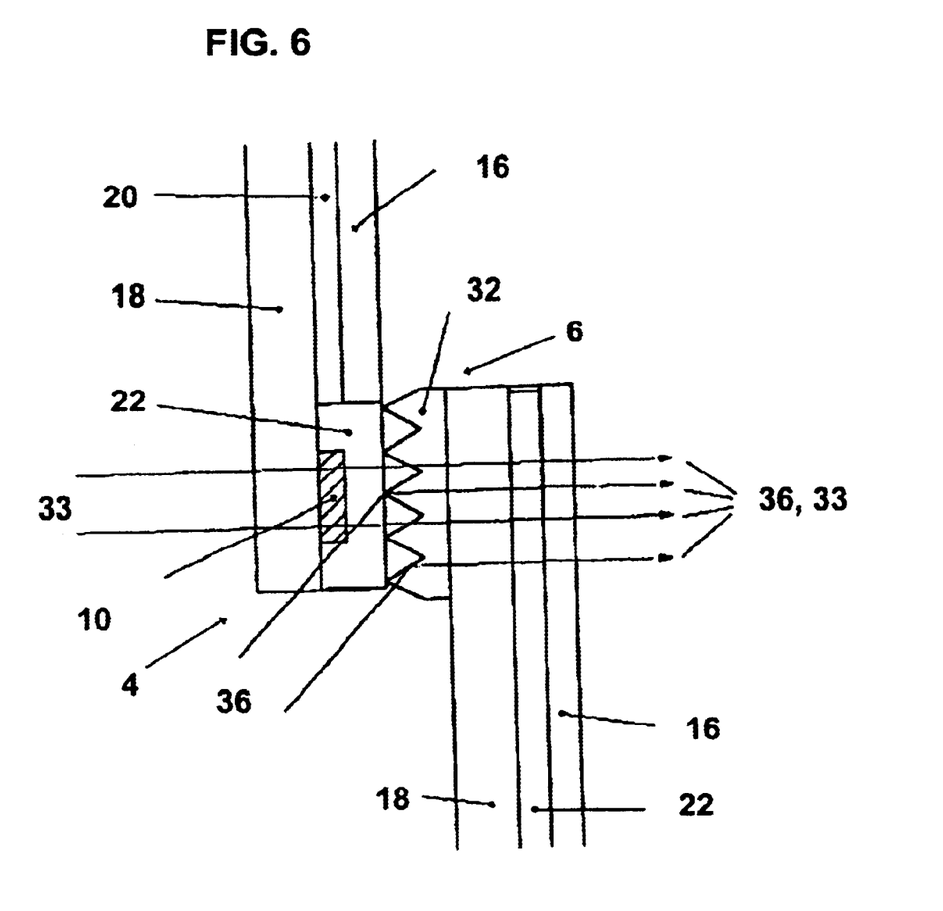

FIGS. 5 and 6 provide detail views of the overlap zone 3. In the case of the embodiment according to FIG. 5, micro-LEDs are provided as illumination elements 30 in the overlap zone 3 between the LCD-display modules 2. According to the embodiment of FIG. 6, a microstructured film is employed as the light deflection element 32.

More specifically, the micro-LEDs 30 further illuminate the second edge zone 6 of the respective LCD-display module 2 and the partial shadowing of the backlight apparatus 24 caused by the control circuit 10 and the lines therefrom is compensated for. This compensation is shown according to the depiction of light beams 34.

Instead of the micro-LEDs 30, it is possible to use organic LEDs (OLED), light emitting polymers (LEP) or cold cathode fluorescent lamps. Also, other light emitting active materials can be used that can be installed within the confined breadth of the separation in the overlap zone 3. As seen in FIG. 5, the current supply and the control of the overlap illuminating element 30 is carried out by a transparent, ribbon conductor 35. The use of a transparent material, such as, for example, polyester or polycarbonate (instead of a Kapton® polyimide available from DuPont High Performance Materials, Circleville, Ohio) also diminishes the shadowing of the backlight apparatus 24.

As briefly introduced, FIG. 6 shows, schematically, a film with a microstructure as a light deflector element 32. The light 36 is incident from the side of the film 32 and is diverted forward on the second edge zone 6 of the respective LCD-display module 2. For example, incoming light beams 36 falling on the side of film 32 are diverted forward through the second edge zone 6. At the same time, the light beams 33 penetrate the transparent matrix 22 in the first edge zone 4 and backlight LCD-display module in the first edge zone 4.

Films, which are appropriate for light deflector element 32, are marketed under the trademark VIKUITI by the firm 3M™ headquartered in St. Paul, Minn. The kind and the thickness of the film are chosen such that the shadowing of the backlight apparatus 24 of the control circuits 10 is compensated for. The change of direction of the light 33 can be achieved by micro-prisms or by Fresnel lenses. Instead of the microstructure, another possibility is the use of correspondingly designed hologram films for light deflection.

In the case of the LCD-display modules 2, polarization filters (not shown) are placed before and after the liquid crystal 20. The LCD-display modules can be operated in the NW-mode (Normally White, transparent at no voltage) or in the NB-mode (Normally Black; dark at no voltage). So that no undesirable shadowing of the backlight apparatus 24 occurs, the filmlike polarization filters are so dimensioned that they only cover over the active display areas of the LCD-display module 2.

Figure 7:
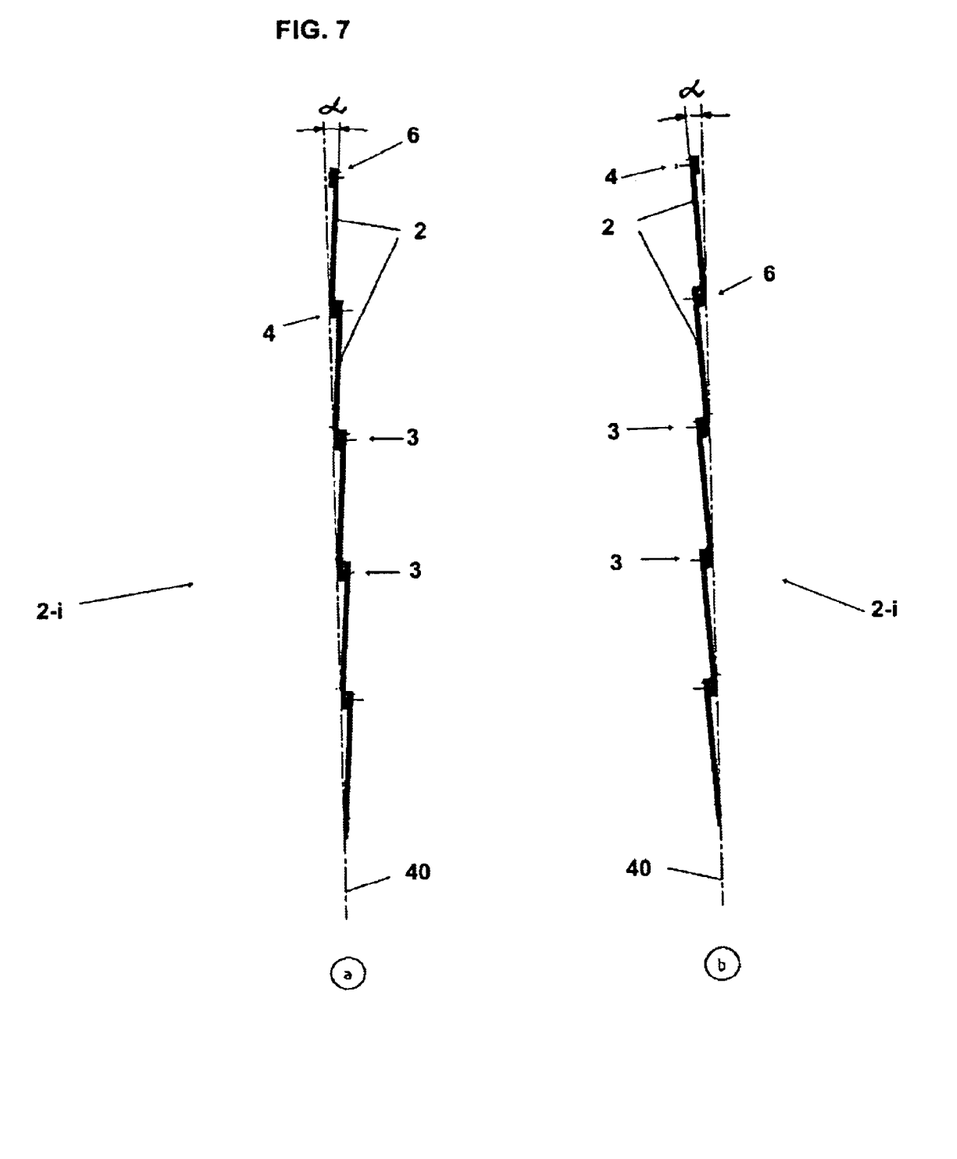
FIGS. 7a and 7b are schematic cross-section presentations, which show inclinations of individual LCD-display modules in relation to the LCD-panel.

FIGS. 7a and 7b show sectional views of the individual LCD-display modules 2. In these schematic presentations, modules 2 are slightly inclined in relation to the entire LCD-display panel 2-i. This inclination is marked by an acute angle α in relation to the entire LCD-display panel 2-i.

FIG. 7a further shows a relative arrangement of LCD-display modules 2 in which the first edge zone 4 is below, and FIG. 7b, conversely, places the first edge zone 4 respectively above the second edge zone 6. The backlight apparatus 24 in the FIGS. 7a and 7b (not shown) would be placed, in FIGS. 7a, 7b, respectively, to the left of the sectional presentation of the LCD-display modules shown.

The inclination of the LCD-display modules 2 in FIGS. 7a and 7b prevents a compounded offset due to the overlapping of the individual LCD-display modules 2 from the top to the bottom. To maintain a relative alignment between the top and the bottom of the modules 2, an angle α lies in a range between 1 and 10°. The arrangement in accord with FIGS. 7a, 7b is especially important in the case of LCD-panels 2-i of large areas.

It is to be noted that the terms "top", "bottom", "above", and "below" and like terms used herein are provided by way of example only and to provide an enabling disclosure. Thus, these terms are not to be construed as limiting the operative orientation of the elements of the present invention such as an embodiment in which the LCD-display modules 2 are horizontally oriented, which is within the scope and purposes of the present invention. Thus, it will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modifications and variations as come within the scope of the appended claims and their equivalents.

That which is claimed is:

1. An LCD panel having a plurality of LCD-modules with a plurality of pixels, a control circuit, and a backlight apparatus, the control circuit in communication with the pixels, the backlight apparatus configured to backlight the control circuit, the LCD panel comprising:

a first edge zone and a second edge zone defined on each of the plurality of LCD-modules, the control circuit disposed about the first edge zone of a first LCD-module of the plurality of LCD-modules, the first edge zone interposed between the backlight apparatus and the second edge zone of a second LCD-module, the first edge zone of the first LCD-module spaced apart from the second edge zone of the second LCD-module at a distance configured to accommodate a light device for shadow reduction.

2. The LCD panel of claim 1, wherein the light device is an overlap illuminating element.

3. The LCD panel of claim 2, wherein the overlap illuminating element is configured to illuminate the second edge zone of the second LCD-module to reduce shadows caused by the backlight apparatus backlighting the control circuit disposed about the first edge zone of the first LCD-module.

4. The LCD panel of claim 2, wherein the overlap illuminating element is selected from the group consisting of a micro-LED, an organic LED, an LEP, a cold cathode fluorescent lighting and combinations thereof.

5. The LCD panel of claim 2, wherein the overlap illuminating element is a cold cathode fluorescent lighting.

6. The LCD panel of claim 2, further comprising an electrical supply in communication with the overlap illuminating element.

7. The LCD panel of claim 6, wherein the electrical supply is a first transparent ribbon conductor.

8. The LCD panel of claim 1, wherein the light device is a light deflector configured to change a direction of light.

9. The LCD panel of claim 8, wherein the light deflector is selected from the group consisting of a film, a microstructure film, a hologram film, a microprism, a Fresnel lens, and combinations thereof.

10. The LCD panel of claim 1, wherein the control circuit is disposed on a transparent carrier material proximate the first edge zone of the first LCD-module.

11. The LCD panel of claim 1, wherein the control circuit is embedded in a transparent matrix.

12. The LCD panel of claim 1, wherein the control circuit is a plurality of control circuits, at least one of the plurality of control circuits disposed on a transparent carrier material proximate the fist edge zone of the first LCD-module, and at least another of the plurality of control circuits disposed on another transparent carrier material proximate the first edge zone of the second LCD-module.

13. The LCD panel of claim 1, further comprising a second transparent ribbon conductor, the second transparent ribbon conductor in electrical communication between the control circuit and a control apparatus.

14. The LCD panel of claim 1, further comprising a polarization filter disposed about the pixels.

15. The LCD panel of claim 1, further comprising a display plane, the first and second edge zone of the LCD-modules substantially coplanar in the display plane.

16. The LCD panel of claim 1, wherein at least one of the LCD-modules is substantially square-shaped, the first and second edge zones disposed on opposite sides of the at least one square-shaped LCD-module.

17. The LCD panel of claim 1, wherein at least one of the LCD-modules is substantially rectangular-shaped, the first and second edge zones disposed on opposite sides of the at least one rectangular-shaped LCD-module.

18. An LCD panel having at least two LCD-modules disposed coplanar in a plane with a plurality of pixels therein, at least one control circuit, and a backlight apparatus, the LCD panel comprising:

a first edge zone and a second edge zone defined on each of the LCD-modules, the first edge zone of a first LCD-module spaced apart from the second edge zone of a second LCD-module such that a lighting device is interposable between the first edge zone of the first LCD-module spaced apart from the second edge zone of the second LCD-module, wherein the at least one control circuit is disposed proximate the first edge zone in a transparent matrix, the backlight apparatus configured to backlight the at least one control circuit, the lighting device configured to redirect light to reduce shadowing caused by the backlight apparatus in cooperation with the at least one control circuit.

19. The LCD panel of claim 18, wherein the lighting device is an overlap illuminating element.

20. The LCD panel of claim 19, wherein the overlap illuminating element is selected from the group consisting of a micro-LED, an organic LED, an LEP, a cold cathode fluorescent lighting and combinations thereof.

21. The LCD panel of claim 19, wherein the overlap illuminating element is a cold cathode fluorescent lighting.

22. The LCD panel of claim 18, wherein the lighting device is a light deflector configured to change a direction of light.

23. The LCD panel of claim 22, wherein the light deflector is selected from the group consisting of a film, a microstructure film, a hologram film, a microprism, a Fresnel lens, and combinations thereof.

24. The LCD panel of claim 18, further comprising a display plane, the first and second edge zone of the LCD-modules substantially coplanar in the display plane.

25. An LCD panel having a backlight apparatus configured to backlight a control circuit for controlling picture elements, the LCD panel comprising:

a first LCD-module having a first edge zone and a second edge zone;

a second LCD-module having a complementary first edge zone and a complementary second edge zone, the first edge zone disposed proximate the complementary second edge zone;

a light device selected from the group consisting of an illuminating element, a light deflector and combinations thereof, the light device operatively interposed proximate the first edge zone and the complementary second edge zone, the light device configured to reduce shadowing caused by the backlight apparatus.

26. The LCD panel of claim 25, wherein the illuminating element is selected from the group consisting of a micro-LED, an organic LED, an LEP, a cold cathode fluorescent lighting and combinations thereof.

27. The LCD panel of claim 25, wherein the light deflector is selected from the group consisting of a film, a microstructure film, a hologram film, a microprism, a Fresnel lens, and combinations thereof.

28. The LCD panel of claim 25, further comprising a plurality of first and second LCD-modules respectively having a plurality of first and second edge zones and a plurality of complementary first and second edge zones, a plurality of light devices operatively interposed proximate the plurality of first edge zones and complementary second edge zones and the plurality of second edge zones and complementary first edge zones such that shadowing caused by the backlight apparatus is reduced.

* * * * *